(12) United States Patent (10) Patent No.: US 8,726,385 B2
Liebmann et al. (45) Date of Patent: May 13, 2014

(54) DISTRIBUTED SYSTEM AND METHOD FOR TRACKING AND BLOCKING MALICIOUS INTERNET HOSTS

(75) Inventors: Nicholas Liebmann, Watford (GB); Raoul Tiddy, Thame (GB); Mike Bishop, Thame (GB)

(73) Assignee: McAfee, Inc., Santa Clara, CA (US)

( * ) Notice: Subject to any disclaimer, the term of this patent is extended or adjusted under 35 U.S.C. 154(b) by 174 days.

(21) Appl. No.: 13/253,266

(22) Filed: Oct. 5, 2011

(65) Prior Publication Data

US 2013/0091584 A1 Apr. 11, 2013

(51) Int. Cl.
G06F 11/00 (2006.01)

(52) U.S. Cl.
USPC .............................................. 726/23; 726/22

(58) Field of Classification Search
None
See application file for complete search history.

(56) References Cited

U.S. PATENT DOCUMENTS

| | | | |
|---|---|---|---|
| 7,028,179 B2 * | 4/2006 | Anderson et al. | 713/154 |
| 7,331,060 B1 * | 2/2008 | Ricciulli | 726/22 |
| 8,286,239 B1 * | 10/2012 | Sutton | 726/22 |
| 2002/0078381 A1 * | 6/2002 | Farley et al. | 713/201 |
| 2002/0194489 A1 * | 12/2002 | Almogy et al. | 713/200 |
| 2003/0212903 A1 * | 11/2003 | Porras et al. | 713/200 |
| 2004/0044912 A1 * | 3/2004 | Connary et al. | 713/201 |
| 2005/0050359 A1 * | 3/2005 | Liang | 713/201 |
| 2005/0193429 A1 * | 9/2005 | Demopoulos et al. | 726/23 |
| 2006/0095970 A1 * | 5/2006 | Rajagopal et al. | 726/25 |
| 2006/0123482 A1 * | 6/2006 | Aaron | 726/25 |
| 2007/0056028 A1 * | 3/2007 | Kay | 726/11 |
| 2007/0064617 A1 * | 3/2007 | Reves | 370/252 |
| 2007/0083929 A1 * | 4/2007 | Sprosts et al. | 726/22 |
| 2008/0028467 A1 * | 1/2008 | Kommareddy et al. | 726/23 |
| 2008/0086772 A1 * | 4/2008 | Chesla | 726/23 |
| 2008/0196099 A1 | 8/2008 | Shastri | |
| 2008/0301810 A1 * | 12/2008 | Lehane et al. | 726/23 |
| 2009/0049550 A1 | 2/2009 | Shevchenko | |
| 2009/0077663 A1 * | 3/2009 | Sun et al. | 726/23 |
| 2009/0138968 A1 * | 5/2009 | Serber | 726/22 |
| 2010/0192196 A1 * | 7/2010 | Lee | 726/1 |
| 2011/0239295 A1 * | 9/2011 | Sorge et al. | 726/22 |

FOREIGN PATENT DOCUMENTS

| | | |
|---|---|---|
| KR | 10-0670815 B1 | 1/2007 |
| KR | 20100078087 A | 7/2010 |
| WO | 2013052621 A1 | 4/2013 |

OTHER PUBLICATIONS

International Search Report and Written Opinion for PCT Application No. PCT/US2012/058687, mailed Mar. 19, 2013.

* cited by examiner

*Primary Examiner* — Darren B Schwartz
(74) *Attorney, Agent, or Firm* — Wong, Cabello, Lutsch, Rutherford & Brucculeri, LLP (57) ABSTRACT

Disclosed are systems and methods to perform coordinated blocking of source addresses, such as an Internet Protocol (IP) addresses, across a plurality of network appliances (e.g., gateways). In one disclosed embodiment the method and system temporarily alter a configuration of one or more network appliances (based on user defined configuration parameters) to allow communication from a "blocked" IP address for a period of time. A network appliance can then "receive" an email and perform analysis and provide results of the analysis to a reputation service. Thereby, the temporarily allowed communication can be used to learn information about a threat which would not have been available if all communication from that IP address had actually been blocked at the network appliance.

29 Claims, 6 Drawing Sheets

DISTRIBUTED SYSTEM AND METHOD FOR TRACKING AND BLOCKING MALICIOUS INTERNET HOSTS

FIELD OF DISCLOSURE

This disclosure relates generally to the field of reputation services to influence an individual network appliance (gateway) to control whether it should block a specific source communication (e.g., a source with a particular Internet Protocol (IP) address) while still protecting the end user from an identified threat. More particularly, but not by way of limitation, this disclosure relates to systems and methods to temporarily alter a configuration of one or more network appliances (based on user defined configuration parameters) to allow communication from a "blocked" IP address for a period of time. The temporarily allowed communication can be used to learn information about a threat which would not have been available if all communication from that IP address had actually been blocked at the network appliance.

BACKGROUND

Currently, an Email and Web Security (EWS) appliance may be configured to block an Internet Protocol (IP) source address for a configurable amount of time (e.g., 10 minutes) when it detects some form of threat. A centralized system and method for determining overall threats (e.g., a Global Threat Intelligence (GTI) system as provided by McAfee, Inc. of Santa Clara, Calif.) uses a received Email (not at an end-user but at a processor to perform analysis) to generate a fingerprint of the Email. These fingerprints may be used by GTI to gain an accurate picture of the threats traversing the Internet at any one time.

However, if an IP address is completely blocked at all network appliances (sometimes called gateways), the appliance cannot receive the Email from the IP address and therefore cannot fingerprint the data to send to the GTI. Furthermore, currently all network appliances work independently and could all be blocking the same IP address. As a result, new threats may not be effectively being fingerprinted and a GTI could be starved of data, likely reducing effectiveness of the GTI.

There are currently no known prior art solutions that specifically instruct individual appliances whether or not to block IP addresses in a coordinated fashion. Current centralized solutions provide the same response to all gateway appliances and let the configuration of the individual gateway determine whether the IP should be blocked. One problem with this model is that both a TrustedSource™ and a GTI may not receive enough information about potential threats (TrustedSource is a trademark of McAfee, Inc.).

To solve these and other problems, methods and systems are disclosed to provide a centralized management system for network appliances whereby different network appliances can be instructed in a coordinated manner to temporarily change their configuration, gather information from particular IP addresses, and then resume their previously configured blocking function.

DETAILED DESCRIPTION

Various embodiments, described in more detail below, provide a technique for performing a centralized and coordinated analysis of email messages from identified IP addresses. Even though this disclosure refers to "IP" addresses specifically, concepts of this disclosure are not tied to any particular version of IP (e.g., IPv4, IPv6, etc.) and may also be applicable to other network technologies and protocols. References to IP addresses, such as "blocked" IP address, are used for clarity. Specific references to an IP address can also be thought of to include any originating source address or other type of "designation of origination" regarding potentially malicious content.

The implementation of disclosed embodiments could utilize a "cloud" of resources for centralized management and analysis. Individual sites or internal networks interacting with the cloud need not be concerned with the internal structure of resources in the cloud and can participate in a coordinated manner to ascertain a more global view of potential threatening "rouge hosts" on the Internet. If the analysis identifies a need for further information about a blocked IP address, a resource (e.g., network appliance) can be temporarily (re) configured such that it does not block the suspected IP address 100% of the time and thus allow for further gathering of information to enhance a collective view of the potential threat. For simplicity and clearness of disclosure, embodiments are disclosed primarily for an email intended for a particular recipient from a particular source host. However, a user's request for a web page or content (such as download of an executable) could similarly be blocked prior to satisfying the user's request. In both of these illustrative cases, internal networks can be protected from objects that may be considered outside of risk tolerances for the given internal network.

Figure 1:
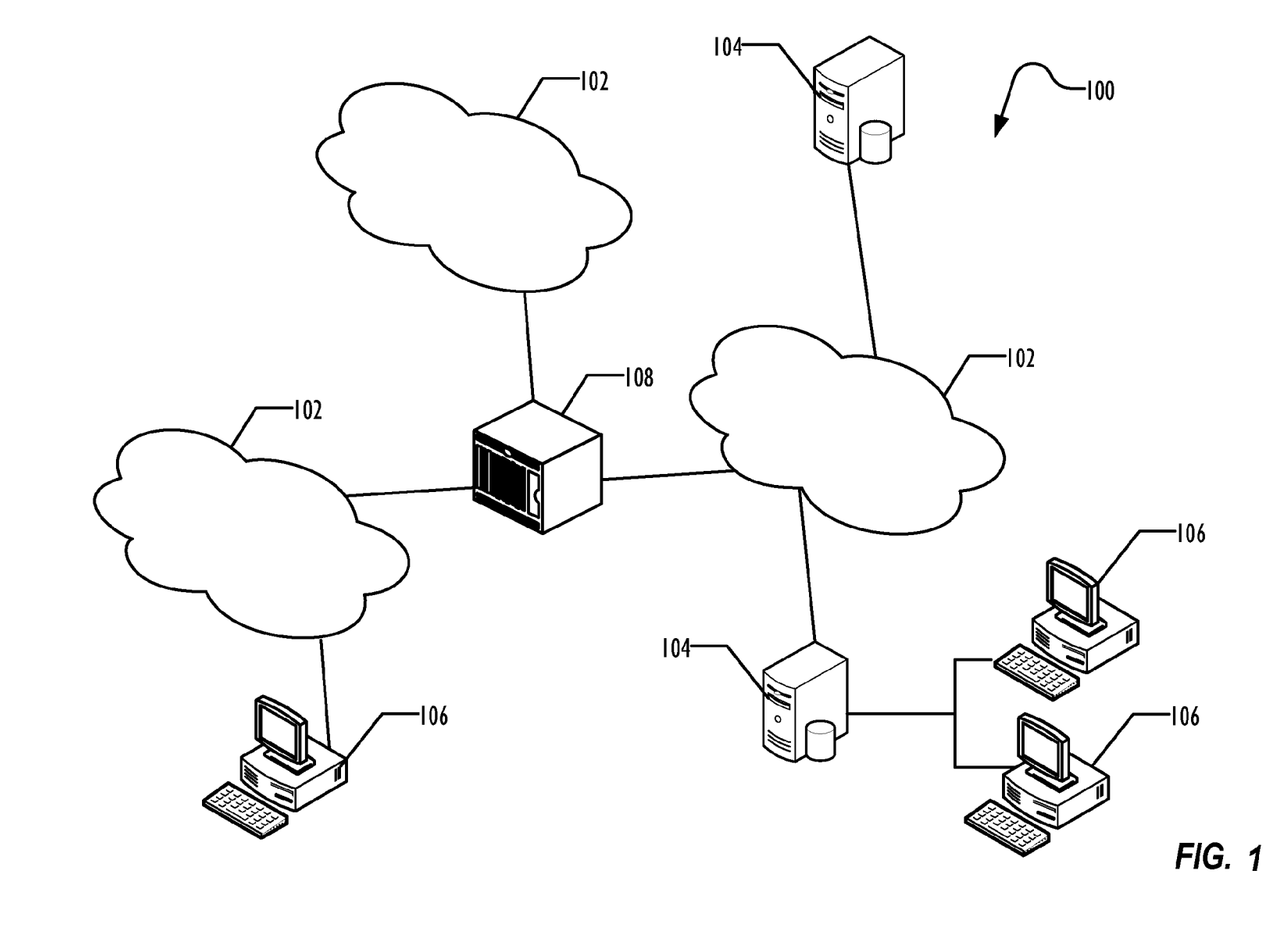
FIG. 1 is a block diagram illustrating a network architecture according to one embodiment.

FIG. 1 illustrates network architecture 100, in accordance with one embodiment. As shown, a plurality of networks 102 is provided. In the context of the present network architecture 100, the networks 102 may each take any form including, but not limited to, a local area network (LAN), a wireless network, a wide area network (WAN) such as the Internet, etc.

Coupled to the networks 102 are data server computers 104 which are capable of communicating over the networks 102. Also coupled to the networks 102 and the data server computers 104 is a plurality of end user computers 106. Such data server computers 104 and/or client computers 106 may each include a desktop computer, lap-top computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled there between.

Figure 2:
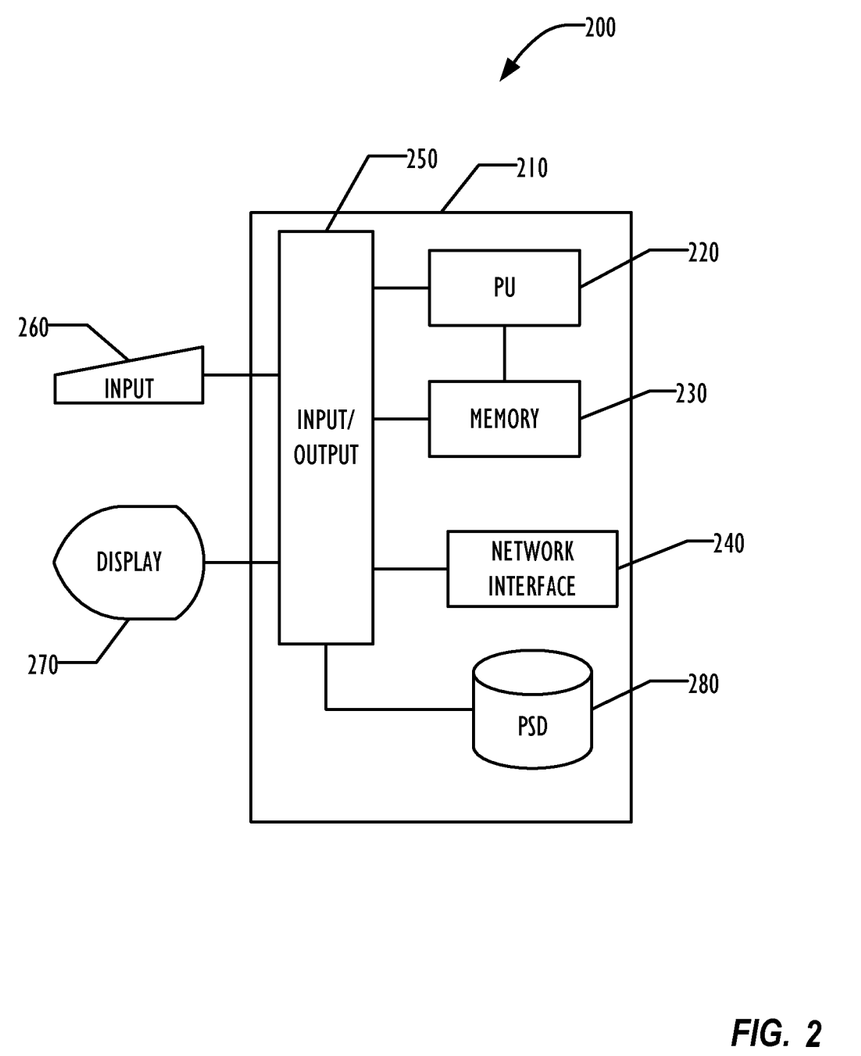
FIG. 2 is a block diagram illustrating a computer on which software according to one embodiment may be installed.

Referring now to FIG. 2, an example processing device 200 for use in providing a coordination of denial of connection technique according to one embodiment is illustrated in block diagram form. The processing device 200 may serve as a gateway or router 108, client computer 106, or a server computer 104. Example processing device 200 comprises a system unit 210 which may be optionally connected to an input device for system 260 (e.g., keyboard, mouse, touch screen, etc.) and display 270. A program storage device (PSD) 280 (sometimes referred to as a hard disc or computer readable medium) is included with the system unit 210. Also included with system unit 210 is a network interface 240 for communication via a network with other computing and corporate infrastructure devices (not shown). Network interface 240 may be included within system unit 210 or be external to system unit 210. In either case, system unit 210 will be communicatively coupled to network interface 240. Program storage device 280 represents any form of non-volatile storage including, but not limited to, all forms of optical and magnetic, including solid-state, storage elements, including removable media, and may be included within system unit 210 or be external to system unit 210. Program storage device 280 may be used for storage of software to control system unit 210, data for use by the processing device 200, or both.

Figure 4A:
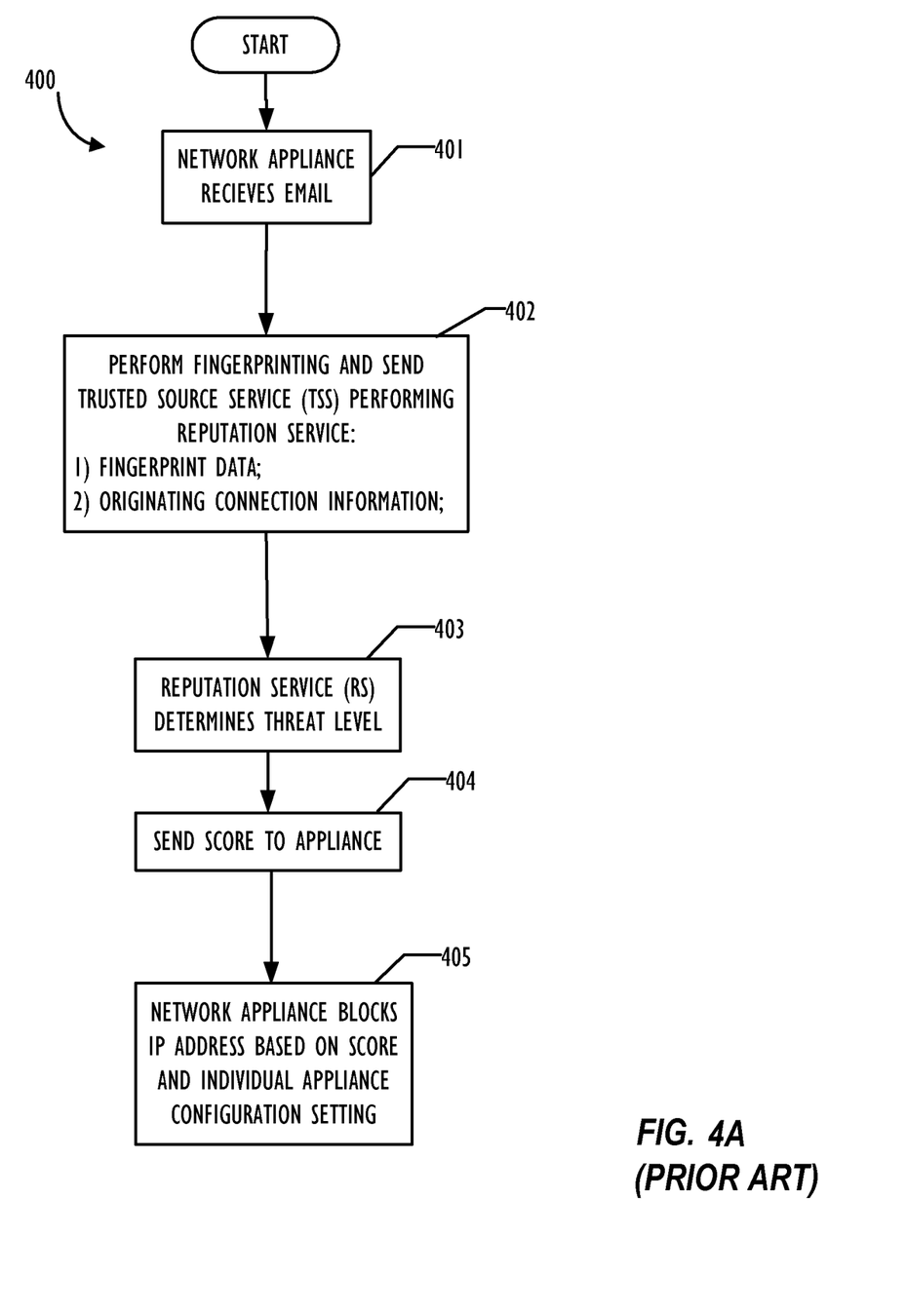
FIG. 4A is a flowchart illustrating a prior art technique for blocking of IP addresses at an individual gateway.
Figure 4B:
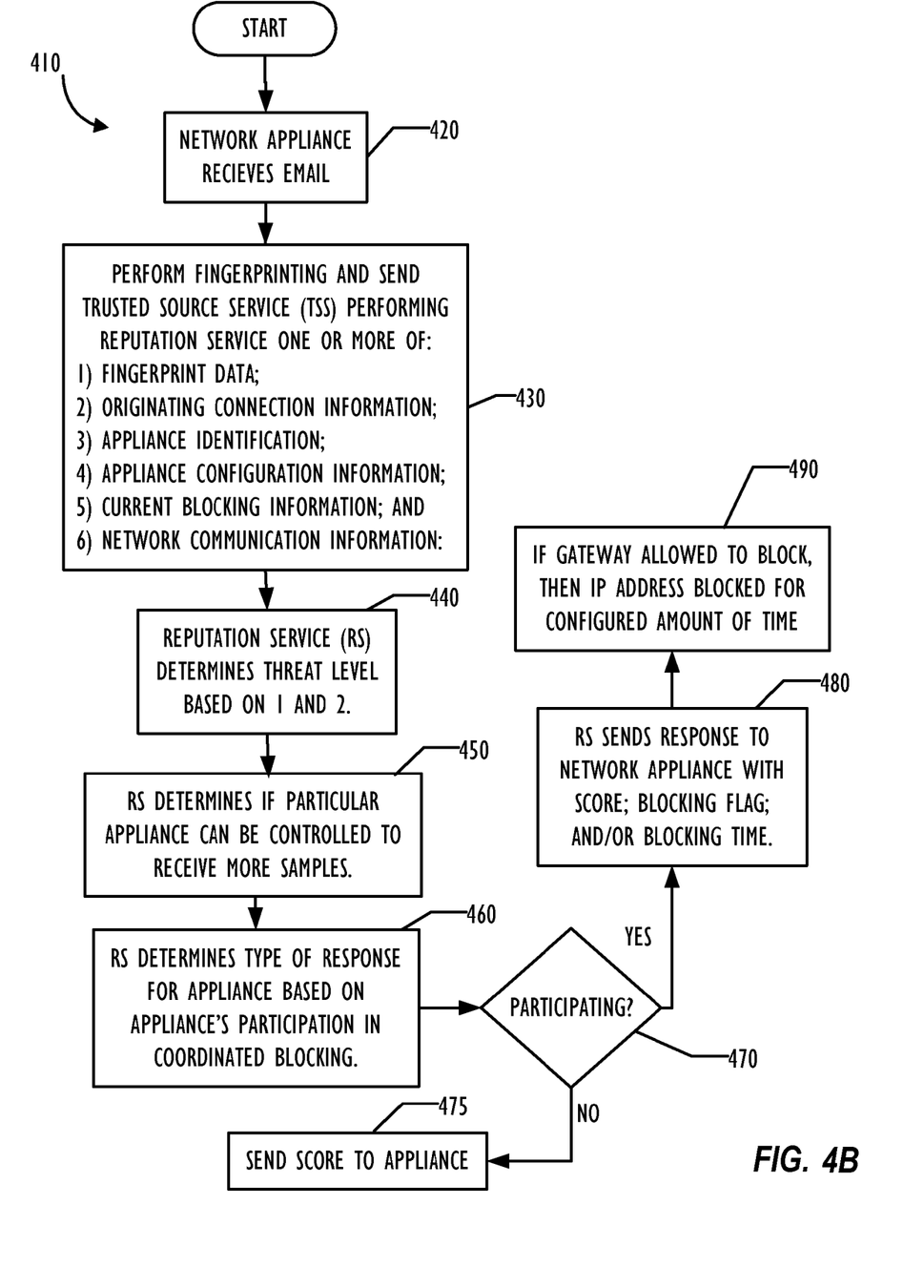
FIG. 4B is a flowchart illustrating a technique for coordinated blocking of IP addresses according to one disclosed embodiment.

System unit 210 may be programmed to perform methods in accordance with this disclosure (an example of which is in FIG. 4B). System unit 210 comprises a processor unit (PU) 220, input-output (I/O) interface 250 and memory 230. Processing unit 220 may include any programmable controller device including, for example, a mainframe processor, or one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 230 may include one or more memory modules and comprise random access memory (RAM), read only memory (ROM), programmable read only memory (PROM), programmable read-write memory, and solid-state memory. The PU 220 may also include some internal memory including, for example, cache memory.

Processing device 200 may have resident thereon any desired operating system. Embodiments may be implemented using any desired programming languages, and may be implemented as one or more executable programs, which may link to external libraries of executable routines that may be provided by the provider of the coordinated IP blocking software, the provider of the operating system, or any other desired provider of suitable library routines.

In preparation for performing disclosed embodiments on the processing device 200, program instructions to configure processing device 200 to perform disclosed embodiments may be provided stored on any type of non-transitory computer-readable media, or may be downloaded from a server 104 onto the program storage device 280. As used herein, references to a "computer system" include a single computer and a plurality of individual computers working together to provide the capability described as being performed by a computer system.

Figure 3:
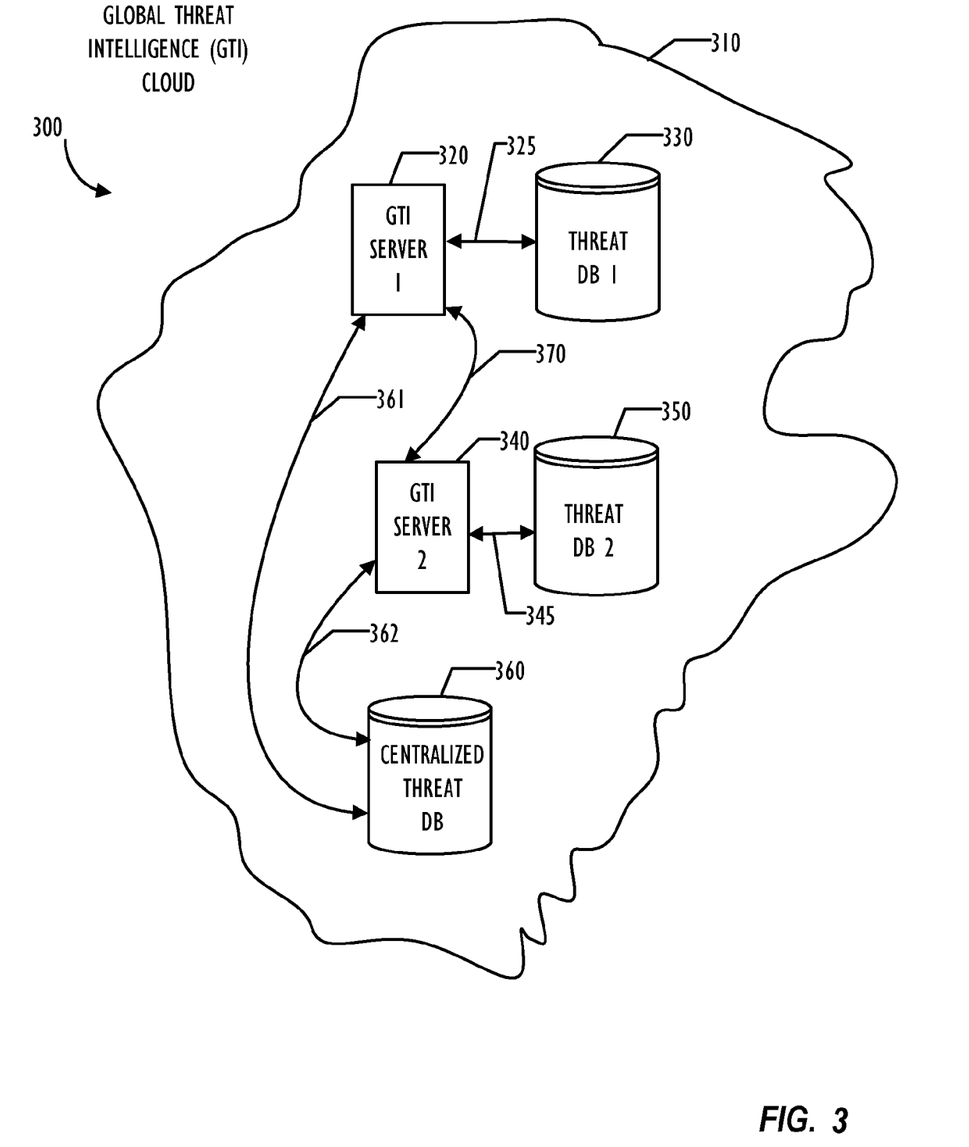
FIG. 3 is a block diagram of a Global Threat Intelligence (GTI) cloud according to one embodiment.

Referring now to FIG. 3, a block diagram 300 illustrates one example of a GTI cloud 310. A GTI cloud 310 can provide a centralized function for a plurality of clients (sometimes called subscribers) without requiring clients of the cloud to understand the complexities of cloud resources or provide support for cloud resources. Internal to GTI cloud 310, there are typically a plurality of servers (e.g., Server 1 320 and Server 2 340). Each of the servers is, in turn, typically connected to a dedicated data store (e.g., 330 and 350) and possibly a centralized data store, such as Centralized DB 360. Each communication path is typically a network or direct connection as represented by communication paths 325, 345, 361, 362 and 370. Although diagram 300 illustrates two servers and a single centralized database, a comparable implementation may take the form of numerous servers with or without individual databases, a hierarchy of databases forming a logical centralized database, or a combination of both. Furthermore, a plurality of communication paths and types of communication paths (e.g., wired network, wireless network, direct cable, switched cable, etc.) could exist between each component in GTI cloud 310. Such variations are known to those of skill in the art and, therefore, are not discussed further here. Also, although disclosed herein as a cloud resource, the essence of functions of GTI cloud 310 could be performed, in an alternate embodiment, by conventionally configured (i.e., not cloud configured) resources internal to an organization.

Referring now to FIG. 4A, flowchart 400 illustrates a prior art technique of a network appliance blocking an IP address based solely upon the combination of its configuration and a score (based on fingerprint data) from a Reputation service. That is, the network appliance, such as gateway 108, is isolated and agnostic to current actions of any other network appliance. Beginning at block 401, a network appliance 108 receives an email from a remote host on an external network such as the Internet (assuming network appliance 108 is not already blocking the IP address associated with the remote host). After receipt, and typically before allowing the email to enter a network on the "other" (e.g., internal) side of network appliance 108, network appliance 108 performs a fingerprint analysis at block 402. Also at block 402, data from the fingerprint analysis and information about the originating connection (e.g., IP address, Hostname) of the remote host is sent to a Trusted Source Service (TSS) performing a Reputation Service (RS). A TSS is typically a provider (i.e., source) of information that is trusted implicitly and relied upon by its consumers. The TSS is typically known and authenticated by clients that connect to it for any of its services. A RS can be one function of a TSS that computes and publishes reputation scores for a set of objects (e.g., service providers, services, goods or entities) within a community or domain, based on a collection of opinions that other entities hold about the objects. Next, at block 403, the RS determines a threat level (i.e., score) from information available to the RS. Information available to the RS includes data sent from network appliance 108 about the object under consideration along with information previously received at the RS. After analysis at the RS, the RS sends a score for the object back to network appliance 108 (block 404). As mentioned above, the score indicates a risk level of the object as determined by pertinent information available to the RS. Finally, at block 405, network appliance 108 determines whether to allow the object to proceed (or access to the object allowed) to its intended recipient. If not allowed, network appliance 108 can block transmission or access to the object. Also, based on its configuration, network appliance 108 may block future communication from the IP address of the identified questionable host for a period of time (e.g., default of 10 minutes).

Referring to FIG. 4B, flowchart 410 illustrates a technique differing from prior art techniques that allows a particular network appliance 108 to perform coordinated blocking of IP addresses with other network appliances via a centralized service as could be implemented by one disclosed embodiment. Beginning at block 420, network appliance 108 receives an email (or other object request). Next, at block 430, network appliance 108 can perform finger printing (or similar type analysis) and send information to a RS. Network appliance 108 may then send finger print data and originating connection information to a TSS performing RS. Different from prior art techniques, network appliance 108 can send additional information for analysis by the RS. Additional information can include one or more of, appliance identification information, appliance configuration information, current blocking information, and network communication information. At block 440 the RS can, in one embodiment, determine a threat level for the object in a manner the same as or similar to prior art techniques. At block 450, the RS can determine if particular network appliance 108 can be controlled to receive more samples (i.e., network appliance 108 is participating in a coordinated blocking as disclosed herein). RS can determine a type of response to send to network appliance 108 based on the appliance's participation status (block 460). If this particular appliance is not participating (the NO prong of decision 470), the RS can send a score to the appliance (block 475) much like in the prior art. Alternatively, if the appliance is participating (the YES prong of decision 470), the RS can send a response that differs from prior art techniques (block 480) with the score in addition to a blocking flag and/or a requested blocking time (which may be zero indicating not to block for any time). Finally, at block 490, the network appliance (gateway) receiving the enhanced information can update its blocking strategy. The blocking strategy can be updated based upon if the appliance is allowed to block for suggested times (e.g., possible additional local configuration settings) and accordingly block for the configured/requested amount of time.

As should be apparent from the above explanation, embodiments disclosed herein allow the network appliance and TSS/RS to work together along with other participating network appliances in a coordinated fashion so that the TSS/RS can continue to receive information that might otherwise have been blocked in its entirety. Therefore, the TSS/RS can provide enhanced and more comprehensive information to all clients subscribing to the TSS/RS. Note, the TSS/RS could track which clients are participating and how they are participating to make sure that unnecessary "non-blocking requests" are kept to a minimum so as not to over burden appliances asked to perform additional analysis of data that might have been previously blocked. Also, in the embodiments specifically disclosed herein, the RS objects comprise web-sites and emails, however other types of objects are contemplated and could benefit from concepts of this disclosure. For example, the RS may be aggregating IP addresses (the source of the connection), conversation attributes (such as senders/recipients), the count of the number of times this IP has made connections to other mail servers (frequency). It may also be worth noting that both the identification of a rogue host and the blocking of a rogue host could be applied to more than just email, any number of IP technologies could be included, such as File Transfer Protocol (FTP), Hypertext Transfer Protocol (HTTP), Voice Over IP (VoIP), Instant Messaging (IM), etc.

Figure 5:
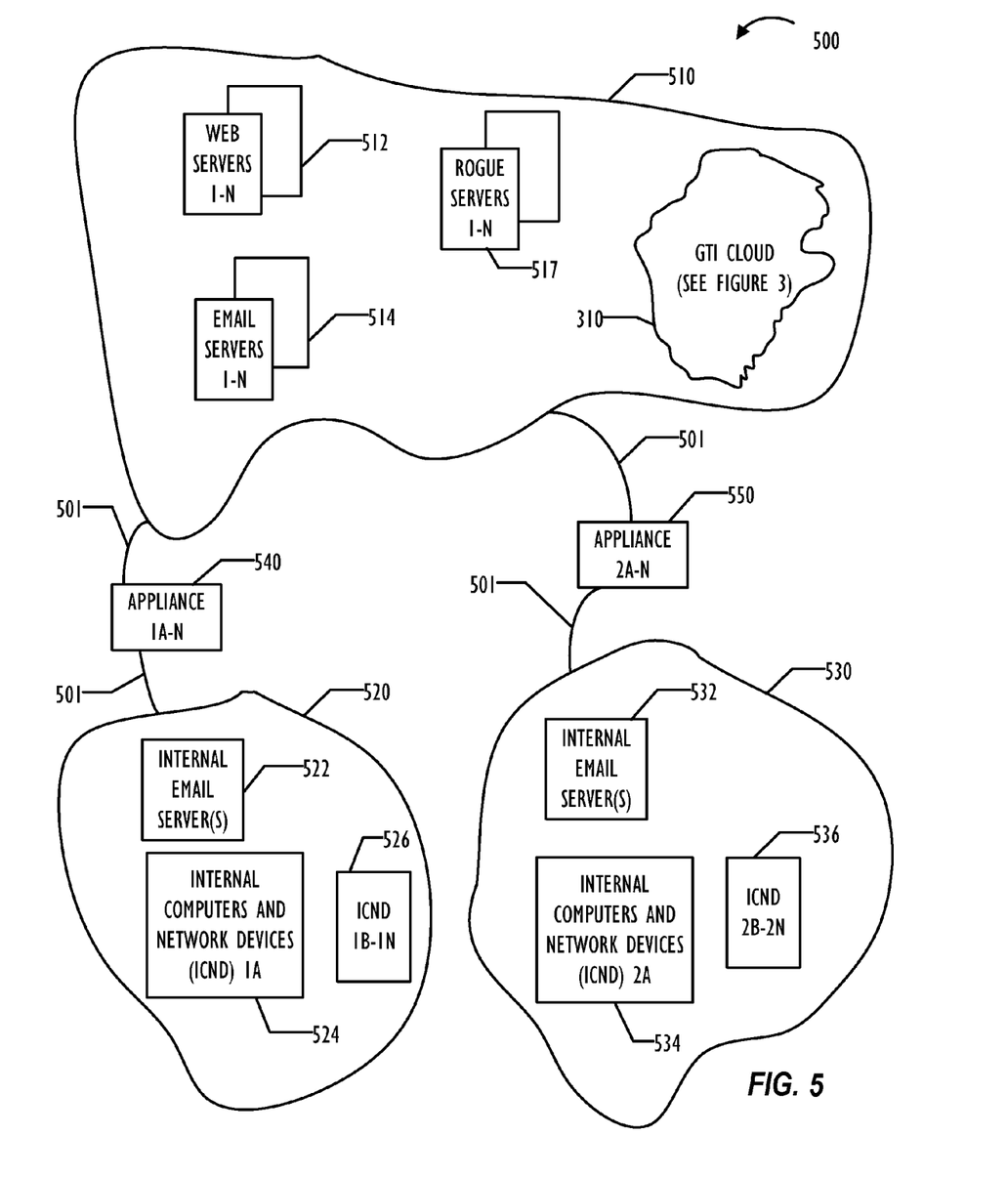
FIG. 5 is a block diagram illustrating a plurality of networks connected to the Internet via a plurality of network appliances configured to perform coordinated blocking utilizing the technique of FIG. 4B.

Referring now to FIG. 5, block diagram 500 illustrates a plurality of networks (520 and 530) connected by connection links 501 to each other and to the Internet (510) via a plurality of network appliances (540 and 550) configured to perform coordinated blocking utilizing the technique of FIG. 4B. Networks 520 and 530 represent two distinct networks which may be internal networks of two different organizations or two different physical or logical networks of a single organization. For example, two regional divisions of a geographically dispersed organization or two divisions of a single organization that may have different security requirements. In any of the above cases, network 520 is connected externally via network appliances 1A-N (540) and network 530 is connected externally via network appliances 2A-N (550).

Network 520 illustrates a simplified internal network that may be typical of a corporate network connected to the Internet 510 via one or more network appliances 1A-N (540). Internal to network 520 are one or more email servers 522 and a plurality of internal computer and network devices (ICND) 524 and 526. ICND 1A 524 represents a single computer network device and ICND 1B-1N 526 represents a plurality of other computer network devices which may be additional routers, laptop computers, desktop computers, or other devices. Each network device may be connected to a network via wired connections or wireless connections utilizing networks and network protocols as are known to those of ordinary skill in the art. An example below illustrates how the plurality of internal devices (522, 524 and 526) can interact with one or more network appliances 540 that provide connections to external networks such as Internet 510. Similarly, network 530 illustrates a second internal network with a second set of email servers 532, single ICND 2A 534 and plurality of ISNDs 2B-2N 536 with each of these internal devices connected to Internet 510 via network appliance(s) 550. As explained above, prior art techniques for blocking IP addresses would have all network appliances 540 working independently from network appliances 550. In contrast, disclosed embodiments allow for network appliances 540 and network appliances 550 to work in a "coordinated" fashion with centralized information available at GTI cloud 310 even though network appliances 540 and network appliances 550 may never directly communicate or have actual knowledge of each other.

Internet 510 illustrates a greatly simplified view of the actual Internet. Internet 510 includes a plurality of external email servers 1-N 514, a plurality of external web servers 1-N, potential rogue servers 1-N 517, and GTI cloud 310 from FIG. 3. As is known to those of ordinary skill in the art, each of the servers in Internet 510 would have a unique address and identification information with some of the servers being legitimate servers and other servers presenting possible threats as rogue servers. As used herein, rouge servers refer to servers impersonating legitimate servers or servers acting in a manner as to possibly disrupt service via spam, malware, viruses, denial of service attacks, etc. A rouge server may in fact be a legitimate server that has become affected in some manner such that it is currently not functioning in an appropriate manner and should be blocked for a period of time to prevent a cascade of disruption across other networks.

The following example outlines one possible scenario of network appliances, which may or may not belong to a single organization but are connected to a consistent RS and could be working in a coordinated fashion with the RS. This example allows a RS to influence an individual gateway to control whether it should block a specific IP address, while still protecting the end user from a threat. First, a gateway would receive an email for analysis prior to sending it to its intended recipient (e.g., ICND 524). The gateway performs fingerprinting operation(s) and sends: fingerprint data, originating connection information, gateway blocking configuration information (e.g., configured to block or not and blocking time if configured to block), reception rate (e.g., rate at which the gateway is receiving connections from this IP address—possibly including blocked connections from the previous X minutes). The RS determines a threat level and determines if it would like the gateway to continue to receive samples from the suspect IP address. The RS's determination can be based on if the user has configured the gateway to block IP addresses or not and whether other gateways are receiving threats from the same IP address. The RS can further determine an amount of time it would like to request the gateway continue to receive from an IP address that would otherwise have been blocked and base the request on the rate at which connections are arriving from the IP address at this and other gateways. Next, the RS can send a response to the requesting gateway with: a score for the particular email (so that the gateway knows what to do with this particular message); a flag indicating whether the gateway can block the IP address (from the perspective of the RS) and the amount of time the RS would like the gateway to block the IP address. As a result, if the gateway is allowed to block the IP address, and the user has configured the gateway to block, the IP address can be blocked for the configured amount of time. As should be apparent, the gateway can still use IP address blocking as an effective means to block threats from known malicious Internet hosts and the RS can likely receive enough sample data to maintain its effectiveness and reduce or eliminate the condition where the reputation system cannot work effectively because all appliances are blocking IP addresses, as soon as the first threat is detected from the address.

As explained above, the RS can determine an amount of time that a particular gateway should block an IP address. This determination can be sent to the gateway as a "request" to which the gateway can agree or disagree based on its own configuration. The determination of agreement by the gateway may be based on the actual score returned along with other local configuration parameters of the gateway. Alternatively, the RS and gateways could be configured in a master-slave arrangement where the RS determination over-rides a local configuration. Yet another local configuration setting at the gateway could allow the RS to be a master only when scores are within a pre-defined range or under/over a threshold. Combinations of the above as well as other combinations for a gateway determining if it should agree to the "request" are also possible.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A computer system configured to facilitate coordinated source blocking, the computer system comprising:
   one or more connections to a plurality of computer networks; and
   one or more processors communicatively coupled to each other wherein the one or more processors are collectively configured to:
      receive information from a first gateway, the information pertaining to a network data transmission from a source address, the source address on a first network and the network data transmission intended for a destination address on a second network, the first and second network not directly connected to each other, the first gateway configured to protect the second network by preventing selected network data transmissions from reaching the second network;
      determine a score based on the received information;
      determine a participation status, the participation status indicating the first gateway's participation in a coordinated source blocking method;
      prepare a first response message for transmission to the first gateway, the first response message comprising an indication of the score and a blocking request indicator, wherein the blocking request indicator comprises information requesting the first gateway not to block future information from the source address even when the score indicates the network data transmission is to be blocked; and
      initiating transmission of the first response message to the first gateway.

2. The computer system of claim 1, wherein the first response message comprises the blocking request indicator only if the participation status indicates participation in the coordinated source blocking.

3. The computer system of claim 1, wherein the network data transmission comprises an email message, a download object, a universal resource locator (URL), an instant message, a file transfer protocol (FTP) transmission, a hypertext transfer protocol (HTTP) transmission, a voice over internet protocol (VOIP) transmission, or a combination thereof.

4. The computer system of claim 1, wherein protocol of the network data transmission comprises Internet Protocol version 4 (IPv4) or Internet Protocol version 6 (IPv6).

5. The computer system of claim 1, wherein the source address comprises an internet protocol (IP) address, a domain name, a universal resource locator (URL), a hostname, or a combination thereof.

6. The computer system of claim 1, wherein the information received from the first gateway comprises a finger print of at least a portion of the network data transmission.

7. The computer system of claim 1, wherein the blocking request indicator in the first response message is based upon blocking status, relative to the source address, of a second gateway.

8. The computer system of claim 1, wherein the blocking request indicator in the first response message is based upon network activity associated with the source address of the network data transmission.

9. The computer system of claim 1, wherein the blocking request indicator in the first response message is based upon configuration information of the first gateway.

10. The computer system of claim 1, wherein the blocking request indicator in the first response message is based upon the determined score.

11. The computer system of claim 1, wherein the computer system comprises a cloud resource.

12. The computer system of claim 1, wherein the one or more processors are further configured to proactively send a second message to a second gateway participating in the coordinated blocking method, the second message comprising a blocking request indicator pertaining to the source address of the network data transmission received by the first gateway regardless of if the second gateway has received a transmission from the source address.

13. The computer system of claim 12, wherein the second message is sent to the second gateway to request the second gateway to not block the source address.

14. The computer system of claim 13, wherein the request to not block the source address indicates a period of time to not block the source address.

15. The computer system of claim 12, wherein the second message is sent to the second gateway to request the second gateway to block the source address.

16. A non-transitory computer readable medium comprising program instructions stored thereon to configure one or more processors to:
receive information from a first gateway, the information pertaining to a network data transmission from a source address, the source address on a first network and the network data transmission intended for a destination address on a second network, the first and second network not directly connected to each other, the first gateway configured to protect the second network by preventing selected network data transmissions from reaching the second network;
determine a score based on the received information;
determine a participation status indicating if the first gateway is participating in a coordinated source blocking method;
prepare a first response message for transmission to the first gateway, the first response message comprising an indication of the score and a blocking request indicator, wherein the blocking request indicator comprises information requesting the first gateway not to block future information from the source address even when the score indicates the network data transmission is to be blocked; and
initiate transmission of the first response message to the first gateway.

17. The non-transitory computer readable medium of claim 16 wherein the blocking request indicator in the first response message is based upon the determined score and the determined participation status of the first gateway.

18. The non-transitory computer readable medium of claim 16 further comprising program instructions to configure one or more processors to send a second message to a second gateway participating in the coordinated blocking method, the second message comprising a blocking request indicator pertaining to the source address of the network data transmission received by the first gateway regardless of if the second gateway has received a transmission from the source address.

19. A network appliance gateway configured to participate in a coordinated source address blocking method, the network appliance gateway comprising:
one or more connections to a first network and a second network, the first and second networks not directly connected to each other, wherein the network appliance gateway is configured to protect the second network by preventing selected network data transmissions from reaching the second network; and
one or more processors communicatively coupled to each other, wherein the one or more processors are configured to:
receive a network data transmission from a source address, the source address on the first network and the network data transmission intended for a destination address on the second network;
perform a fingerprint analysis of at least a portion of the network data transmission;
send a first message to a centralized blocking coordination computer system, the first message comprising an indication of the fingerprint analysis, an indication of the source address, and blocking configuration information pertaining to the network appliance gateway wherein the blocking configuration information comprises an indication of participation status, in a coordinated source address blocking method, for the network appliance gateway;
receive a second message in response to the first message, the second message comprising a score related to the information in the first message and a blocking request, wherein the blocking request comprises information requesting the network appliance gateway not to block future information from the source address even when the score related to the information in the first message indicates the network data transmission is to be blocked by the network appliance gateway; and
determine to block or not block communication from the source address based on the blocking request and on information in the second message.

20. The network appliance gateway of claim 19 wherein the network appliance gateway is configured as a subscriber to a cloud performing a centralized blocking function.

21. The network appliance gateway of claim 19 wherein blocking of transmissions from the source address is only performed if the score is above a configured threshold.

22. The network appliance gateway of claim 19 wherein blocking of transmissions from the source address is determined based on local configuration information of the network appliance gateway.

23. The network appliance gateway of claim 19 wherein the second message further indicates a period of time associated with the request not to block future information from the source address.

24. The network appliance gateway of claim 19 wherein the second message further comprises network communication information pertaining to the source address and blocking of transmissions from the source address is determined based at least in part on the network communication information.

25. The network appliance gateway of claim 19, wherein the network data transmission comprises an email message, a download object, a universal resource locator (URL), an instant message, a file transfer protocol (FTP) transmission, a hypertext transfer protocol (HTTP) transmission, a voice over internet protocol (VOIP) transmission, or a combination thereof.

26. The network appliance gateway of claim 19, wherein protocol of the network data transmission comprises Internet Protocol version 4 (IPv4) or Internet Protocol version 6 (IPv6).

27. The network appliance gateway of claim 19, wherein the source address comprises an internet protocol (IP)

address, a domain name, a universal resource locator (URL), a hostname, or a combination thereof.

28. A non-transitory computer readable medium comprising program instructions stored thereon to configure one or more processors to:
    receive a network data transmission from a source address, the source address on a first network and the network data transmission intended for a destination address on a second network, the one or more processors configured to protect the second network by preventing selected network data transmissions from reaching the second network;
    perform a fingerprint analysis of at least a portion of the network data transmission;
    send a first message to a centralized blocking coordination computer system, the first message comprising an indication of the fingerprint analysis, an indication of the source address, and blocking configuration information pertaining to the one or more processors, wherein the blocking configuration information comprises an indication of participation status, in a coordinated source address blocking method, for a network appliance gateway;
    receive a second message in response to the first message, the second message comprising a score related to information in the first message and a blocking request, wherein the blocking request comprises information requesting the one or more processors not to block future information from the source address even when the score related to information in the first message indicates the network data transmission is to be blocked by the one or more processors; and
    determine to block or not block future communication from the source address based on the blocking request and on information in the second message.

29. A network appliance gateway configured to participate in a coordinated source address blocking method, the network appliance gateway comprising:
    one or more connections for connection to a first network and a second network, the first and second networks not directly connected to each other, wherein the network appliance gateway is configured to protect the second network by preventing selected network data transmissions from reaching the second network; and
    one or more processors communicatively coupled to each other, wherein the one or more processors are configured to:
        receive a message from a centralized blocking coordination computer system, the message comprising a request for the network appliance gateway not to block future network data transmissions from a source address on the first network wherein the network appliance gateway has not previously received a network data transmission from the source address after the centralized blocking coordination computer system has determined that network data transmissions from the source address have a score above a blocking threshold; and
        determine to not block communication from the source address based on the blocking request and on information in the message wherein the determination is based at least in part on local configuration information of the network appliance gateway.

* * * * *